(12) United States Patent
Karaki et al.

(10) Patent No.: US 8,400,033 B2
(45) Date of Patent: Mar. 19, 2013

(54) UNLOCKING ACTUATOR

(75) Inventors: Masakazu Karaki, Hyogo (JP); Hitoshi Osafune, Hyogo (JP); Akihiko Inaoka, Hyogo (JP)

(73) Assignee: Hi-Lex Corporation, Hyogo (JP)

( * ) Notice: Subject to any disclaimer, the term of this patent is extended or adjusted under 35 U.S.C. 154(b) by 446 days.

(21) Appl. No.: 12/739,757

(22) PCT Filed: Oct. 24, 2008

(86) PCT No.: PCT/JP2008/069324
§ 371 (c)(1),
(2), (4) Date: Apr. 26, 2010

(87) PCT Pub. No.: WO2009/060730
PCT Pub. Date: May 14, 2009

(65) Prior Publication Data
US 2010/0259120 A1    Oct. 14, 2010

(30) Foreign Application Priority Data
Nov. 9, 2007    (JP) .................................. 2007-292102

(51) Int. Cl.
*H02K 7/116*    (2006.01)
(52) U.S. Cl. ......................................................... 310/83
(58) Field of Classification Search .................. 310/83; 70/275, 277, 278.1, 278.7; 74/425, 412 R, 74/414, 424.6; 292/144, 201, DIG. 23, DIG. 25; 297/354.1, 361.1
See application file for complete search history.

(56) References Cited

U.S. PATENT DOCUMENTS

| | | | | |
|---|---|---|---|---|
| 4,691,584 A * | 9/1987 | Takaishi et al. | ............. | 74/471 R |
| 5,531,498 A * | 7/1996 | Kowall | ........................ | 296/146.4 |
| 5,813,282 A * | 9/1998 | Azuma | ........................ | 74/89.22 |
| 7,152,922 B2 * | 12/2006 | Garland | .................... | 297/362.11 |
| 2006/0214457 A1 | 9/2006 | Fukada et al. | | |

FOREIGN PATENT DOCUMENTS

| | | |
|---|---|---|
| JP | 61-241814 | 10/1986 |
| JP | 11793/1986 | 8/1987 |
| JP | 63-223278 | 9/1988 |
| JP | 129029/1989 | 7/1991 |
| JP | 10-159418 | 6/1998 |
| JP | 2006-264587 | 10/2006 |
| JP | 2006-342512 | 12/2006 |
| JP | 2007-56496 | 3/2007 |

* cited by examiner

*Primary Examiner* — Tran N. Nguyen
*Assistant Examiner* — Eric Johnson
(74) *Attorney, Agent, or Firm* — Rahman LLC (57) ABSTRACT

An unlocking actuator for automatic unlocking of vehicle seat and manual unlocking of vehicle seat. Rotary torque generated by an electric motor in order to unlock a vehicle seat is transmitted to a rotary gear which is thereby rotated. A substantially sectorial insertion hole is formed in a pulley along the rotational direction and an abutting surface is formed on one end side of the insertion hole. A first inner cable has one end fixed to a first groove for winding formed in the outer circumferential part of the pulley and wound in the first groove for winding, and the other end connected with an unlocking mechanism. A second inner cable has one end fitted idly in a second groove for winding formed in the outer circumferential part of the pulley and wound in the second groove for winding, and the other end connected with an unlocking operation rod.

5 Claims, 8 Drawing Sheets

UNLOCKING ACTUATOR

TECHNICAL FIELD

The present invention relates to an unlocking actuator.

BACKGROUND

Previously, as an actuator doing locking/unlocking operations of vehicle seat and door automatically, an actuator which consists of an electric motor having drives inside mutually combined housing, a worm gear installed in the drives, and a worm wheel which revolves engaged with the worm gear is disclosed (For example, Japanese Unexamined Patent Publication No. 16155/2005).

In addition, as an actuator unlocking a fuel filler lid of vehicles automatically, a fuel filler lid actuator which has an unlocking function by electric motor is disclosed (For example, Japanese Unexamined Patent Publication No. 65216/2001).

Also, as an actuator which is able to operate a chair back of vehicles manually from a rear hatch, a branch equipment of control cables is disclosed (For example, Japanese Unexamined Patent Publication No. 57827/2006). In this example, a remote lever installed in the side of rear hatch is connected to drives of vehicle seat in order to control vehicle seat remotely from the side of rear hatch where one can't touch vehicle seat directly.

SUMMARY

However, the above actuators include both automatic operation and manual operation by electric motor to lock/unlock vehicle seat or to lock a fuel filler lid. Therefore, these actuators need constituent parts to realize said automatic operation, and constituent parts to realize said manual operation. That causes the problems of increasing parts of actuators, assembling steps, and manufacturing cost of the actuators.

It is an object of the present invention to provide an unlocking actuator which can achieve both unlocking of vehicle sheet by automatic operation, and unlocking of vehicle sheet by manual operation using a simple mechanism.

In an unlocking actuator of the present invention, rotary torque generated by an electric motor in order to unlock a vehicle seat is transmitted through rotary torque transmission means to a rotary gear which is thereby rotated. A substantially sectorial insertion hole is formed in a pulley along the rotational direction and an abutting surface is formed on one end side of the insertion hole. A first inner cable has one end fixed to a first groove for winding formed in the outer circumferential part of the pulley and wound in the first groove for winding, and the other end connected with an unlocking mechanism.

A second inner cable has one end fitted idly in a second groove for winding, and the other end connected with an unlocking operation rod. The rotary gear installed in which it corresponds with the insertion hole has an opposite surface from the abutting surface of the pulley with the rotary gear slipped into the insertion hole, and has a substantially sectorial projecting portion rotating inside the insertion hole.

The pulley unlocks the lock with activating the unlock mechanism when the rotary torque is transmitted to the rotary gear and the opposite surface abuts the abutting surface, by winding the first inner cable into the side of the pulley and rotating with the rotary gear. Also, the pulley unlocks the lock with activating the unlock mechanism when the second inner cable is pulled to the side of the unlocking operation rod by itself, by rotating and pulling the first inner cable to the side of the pulley.

DETAILED DESCRIPTION OF PREFERRED EMBODIMENTS

Embodiment 1

Figure 1:
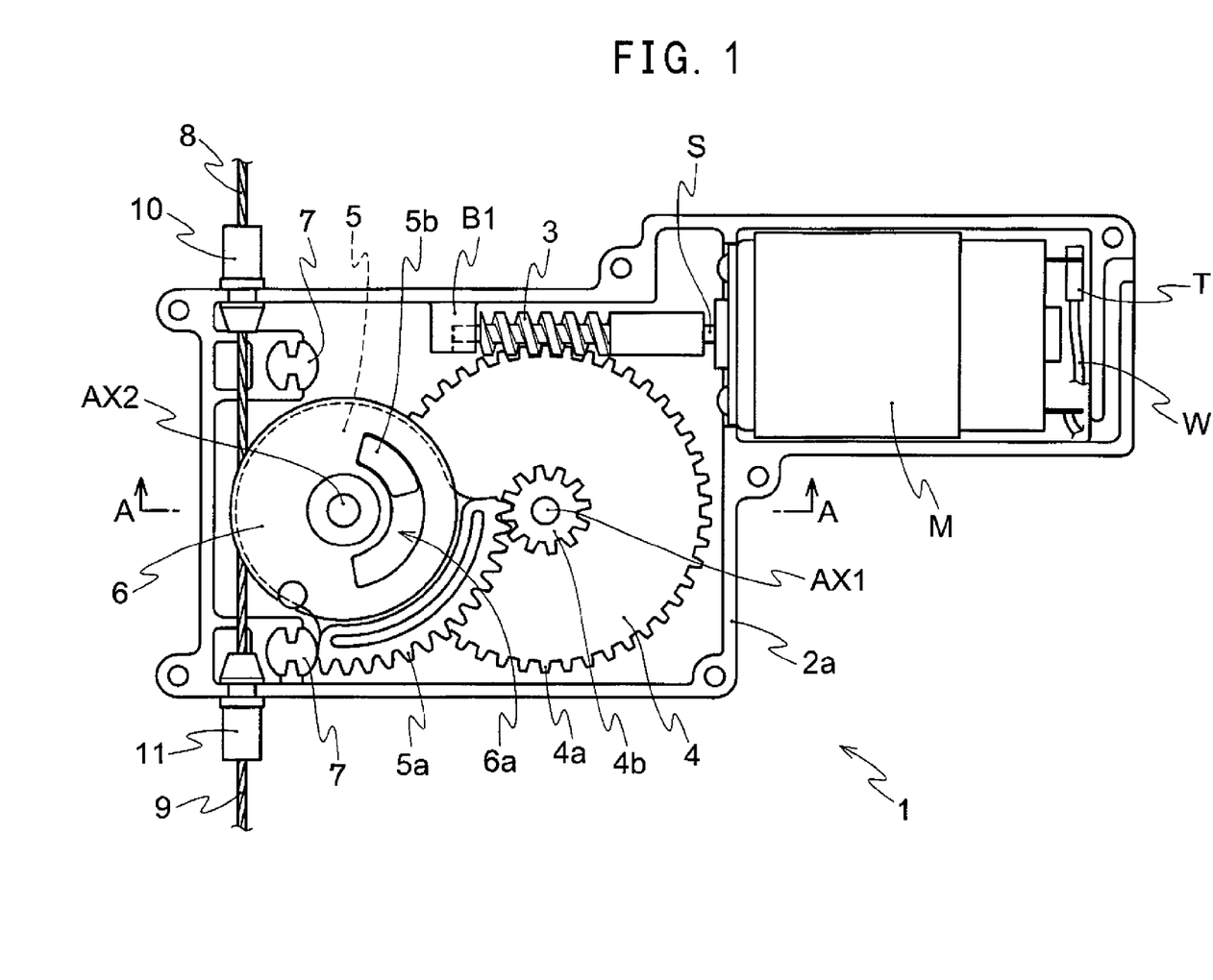
FIG. 1 is a ground plan showing the state in which one of the housing of the unlocking actuator according to the present invention is removed.
Figure 2:
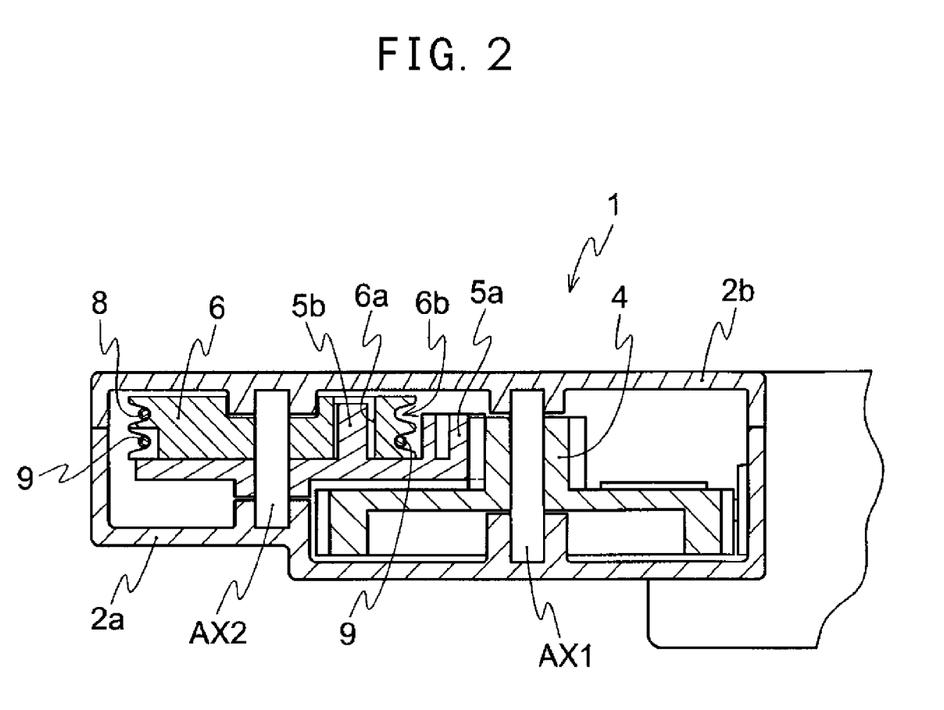
FIG. 2 is a cross-sectional view of A-A line of the unlocking actuator shown in FIG. 1.
Figure 3:
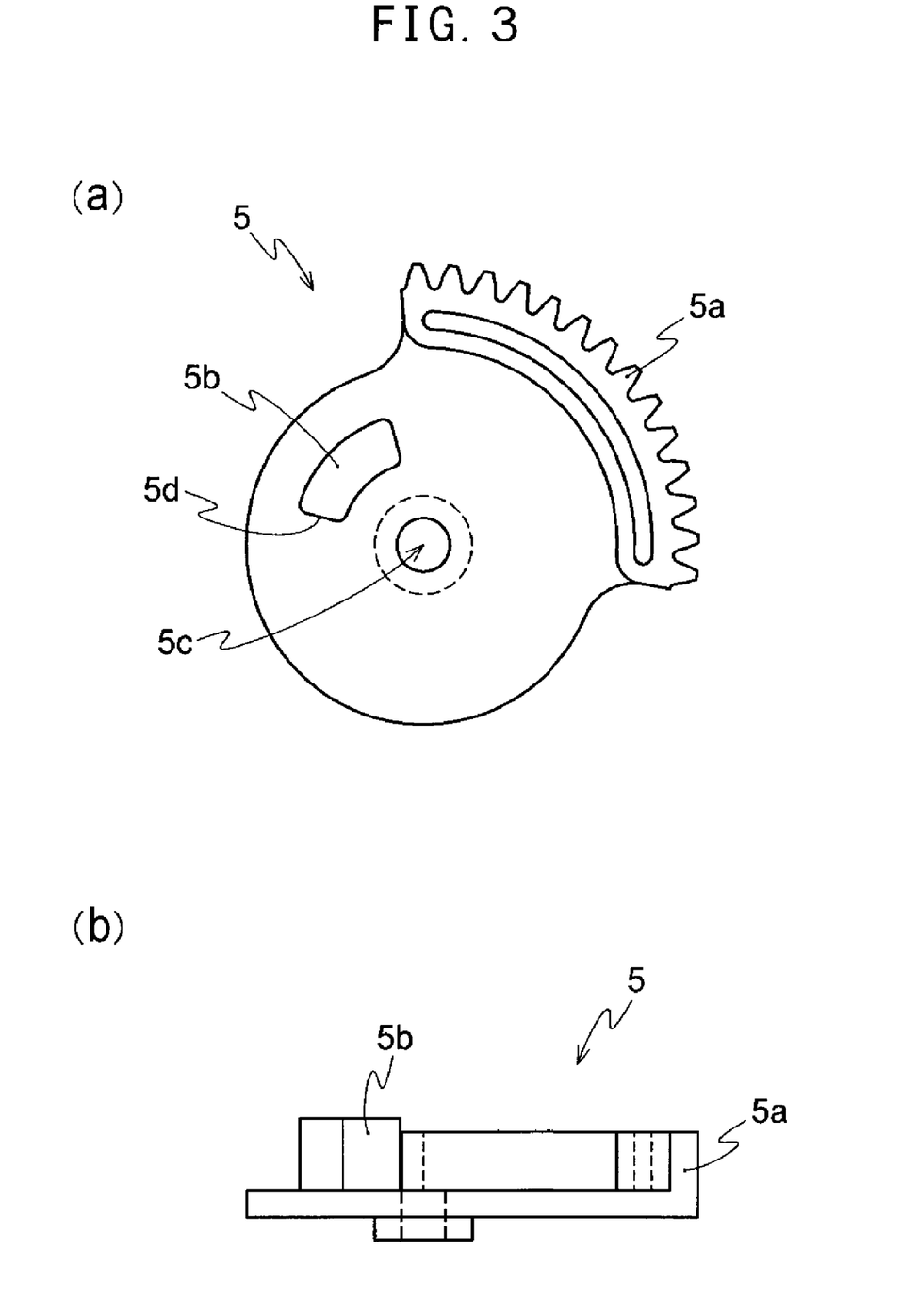
FIG. 3 is an explanatory diagram showing the details of the rotary gear.

With reference to the accompanying drawings, un unlocking actuator which is one embodiment of the present invention is explained. FIG. 1 shows a ground plan showing the state in which the other housing 2b of the unlocking actuator of the present invention is removed, and FIG. 2 shows a cross-sectional view of A-A line of FIG. 1 respectively. FIG. 3(*a*), (*b*) shows a front and a down side view of a rotary gear 5, and FIG. 4(*a*), (*b*) shows a front and a down side view of a pulley 6 respectively. The unlocking actuator 1 shown in FIG. 1 is contained in a housing 2 (2a, 2b). In this example, the housing 2a, 2b are formed separately each other.

On one end side inside the housing 2, a motor M (electric motor) is arranged to unlock the vehicle seat. In this motor 2, a connector section T is connected via a wire W to supply the motor M with electric power. From the motor M, a stick shaft S stretches towards the other end side inside the housing 2. The tip of the shaft S is inserted into a shaft receptor section B1, and is enabled to rotate freely. In this shaft S, a cylindrically formed worm gear 3 (rotary torque transmission mean) having spiral teeth on the perimeter is fixed.

In the housing 2, a worm wheel 4 (rotary torque transmission mean) having a great gear section 4a in the perimeter is provided. As regards the worm wheel 4, it is enabled to rotate freely by a shaft AX1 supported by the housing 2a and 2b of its end sides, and the great gear section 4a is meshed with the worm gear 3. The worm wheel 4 has a small gear section 4b, and it stretches from the center of the worm wheel to the side of the pulley 6 cylindrically. The worm wheel 4 is arranged clockwise by an unillustrated coil spring, and stops in the initial position of FIG. 1.

On the other end side inside the housing 2, rotary gear 5 is arranged to rotate freely. In the perimeter of the rotary gear 5, substantially sectorial gear 5a is provided. The rotary gear 5 is enabled to rotate freely by a shaft AX2 supported by the housing 2a and 2b of its end sides, and the sectorial gear 5a is meshed with the small gear section 4a of the worm wheel 4. Also, the rotary gear 5 has a projecting portion 5b which is provided to stretch towards the side of the pulley 6 substantially. In addition, the shape of the projecting portion 5b could be other shapes such as circular-shaped if it is able to abut on the insertion hole 6a of the pulley 6.

Figure 4:
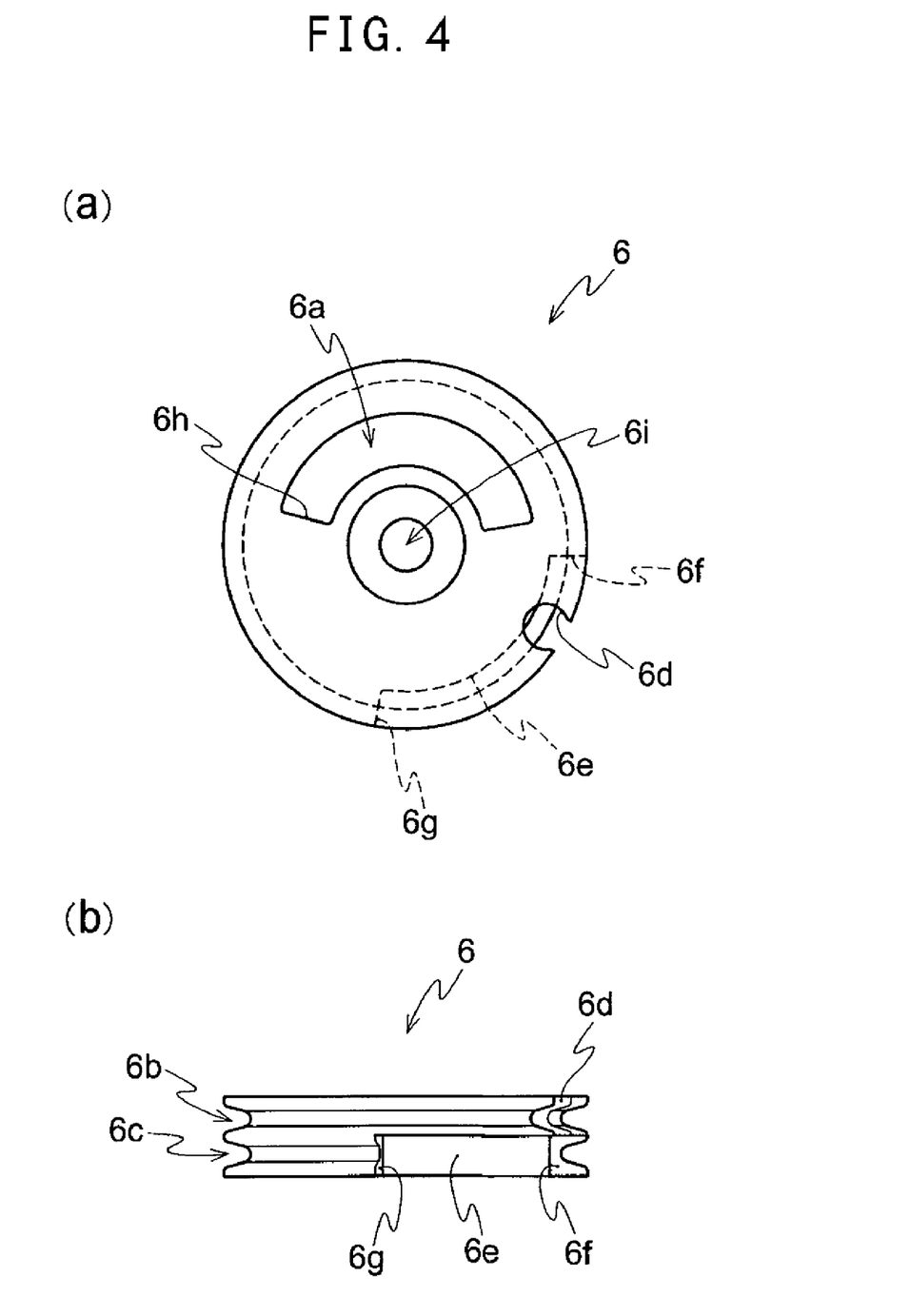
FIG. 4 is an explanatory diagram showing the details of the pulley.

On the other end side inside the housing 2, the pulley 6 is arranged to rotate freely. In the pulley 6, the substantially insertion hole 6a which centers the center of the outside diameter of the pulley is formed. This pulley 6 is, in the state of that the projecting portion 5b of the rotary gear 5 inserted into the insertion hole 6a, arranged to rotate freely by the AX2 via a penetration 6i (FIG. 4 (*a*)). In the perimeter of the pulley 6, a first groove for winding 6b and a second groove for winding 6c which is rotated respectively with the first inner cable 8 and the second inner cable 9 shown in FIGS. 1, 2 are formed.

Figure 6:
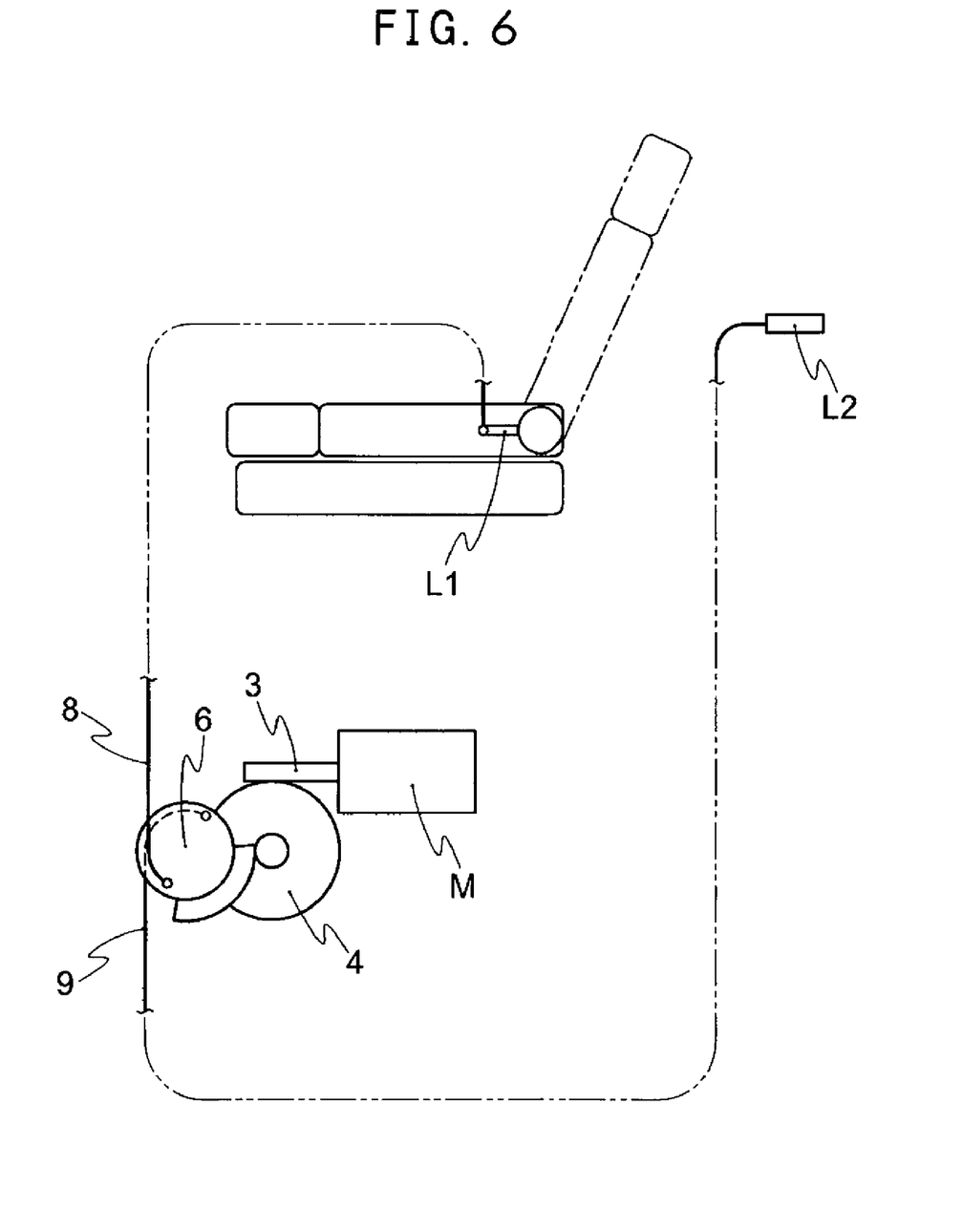
FIG. 6 shows the unlocking mechanism connected to the unlocking actuator of the present invention.

A pair of rubber damper 7 is provided on the other end side of the housing 2 to prevent the sound caused by a contact between the rotary gear 5 and the housing 2. Furthermore, natural rubber and synthetic rubber are used as the rubber damper 7 for example. One end side 8a of the first inner cable 8 is fixed on the first groove for winding 6b provided in the perimeter of the pulley 6, and rotated to the first groove for winding 6b counterclockwise. On the other end side of the first inner cable 8, as shown in FIG. 6, an unlocking lever L1 which is unlocking mechanism unlocks vehicle seat is connected.

One side end 9a of the second inner cable 9 is fitted to the second groove for winding provided in the perimeter of the pulley 6, and rotated to the second groove for winding 6c clockwise. On the other end side of the second inner cable, manual unlocking operation rod L2 which unlocks vehicle seat is connected as shown in FIG. 6. In addition, as described later, the present invention functions as an unlocking activator only with the first inner cable 8, thus the second inner cable 9 is not always necessary. In that case, there is no need of the unlocking operation rod L2 either. Inner cable guides 10, 11 prevent the first inner cable 8 and the second inner cable 9 from contacting with the housing 2, and in case an outer casing is used, the inner cable guides are attached to the outside of the housing 2 in order to fix the end side of the outer casing to the housing 2.

As shown in FIG. 4(*a*), (*b*), in the first groove for winding 6b (FIG. 2) of the pulley 6, islands 6d is formed to engage one end side 8a of the first inner cable. On the other hand, as shown in FIG. 4(*a*), (*b*), in the second groove for winding 6c (FIG. 2) of the pulley 6, a first abutting surface 6f and a second abutting surface 6g where one end side 9a of the second inner cable abuts are formed, and a small outside diameter section 6e stretching the abutting surfaces 6f, 6g is formed. As regards the small outside diameter 6e is formed smaller than the other sections of the pulley.

Figure 5:
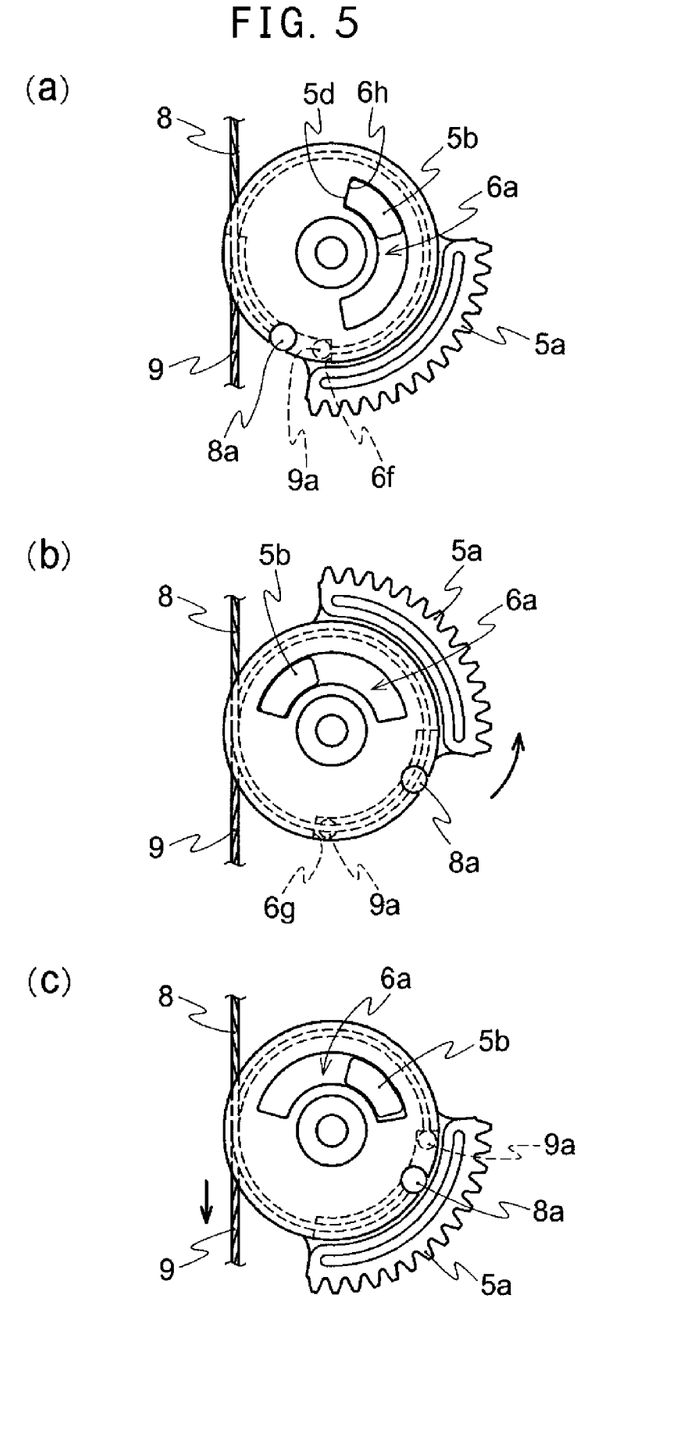
FIG. 5 is an explanatory diagram showing the unlocking operation of the unlocking actuator of the present invention.

FIG. 5 is an explanatory diagram showing the unlocking operation of the embodiment 1. In FIG. 5(*a*), the rotary gear 5 stops in the initial position of FIG. 1 in the state where the rotary gear 5 is arranged clockwise via the worm wheel 4 by a coil spring (unillustrated), and vehicle seat is fixed in the initial position by a locking mechanism (unillustrated). In this locked state, an opposite surface 5d (FIG. 3(*a*)) formed in a projecting portion 5b of the rotary gear attaches an abutting surface 6h (FIG. 4(*a*)) formed in an insertion hole 6a of the pulley 6, and one side end 9a of the second inner cable 9 attaches a first abutting surface 6f (FIG. 4 (*b*)) of the pulley 6.

FIG. 5(*b*) is an explanatory diagram showing the unlocking operation using an electric motor M. In order to unlock vehicle seat from the locked state described in FIG. 5(*a*), the supply of the electric power to the motor M is started. Synchronized with the supply of the electric power, a rotary torque generated by electric motor M is transmitted to a sectorial gear section 5a through a worm gear 3 and a worm wheel 4, the rotary gear 5 and the pulley 6 rotate counterclockwise, the first inner cable 8 is rotated by the first groove for winding 6b of the pulley 6, and thereby the unlocking mechanism is operated. By this operation, the unlocking of the vehicle seat is achieved.

In addition, one end side 9a of the second inner cable 9 reaches the second abutting surface 6g from the first abutting surface 6f along the small outside diameter, by the rotary of the pulley 6. When the operation of the unlocking mechanism is finished, by the restoring force of the coil spring provided in the unlocking mechanism and the coil spring provided in the worm wheel 4, the worm gear 3, worm wheel 4, and pulley 6 are returned to the initial position (FIG. 5(*a*)).

Furthermore, in this embodiment, the second abutting surface is provided in the position complied with the number of revolution of the pulley 6 of when the unlocking operation of the unlocking mechanism is finished, and the second abutting surface abut on one end side 9a of the second inner cable 9. However, it is unnecessary that one end side 9a of the second inner cable 9 abuts when the unlocking operation of the unlocking mechanism.

FIG. 5(*c*) is an explanatory diagram showing the unlocking operation using the manual unlocking operation rod. In this example, the manual unlocking operation rod is operated by drivers or the like to unlock the vehicle seat from the locked state as FIG. 5(*a*). By this operation, the second inner cable 9 is pulled into the side of the manual unlocking operation rod (downside of FIG. 5), and thereby the pulley 6 rotates counterclockwise. By this rotating, similar to FIG. 5(*b*), the first inner cable 8 is rotated into the first groove for winding 6b of the pulley 6 to operate the unlocking mechanism, and the lock of the vehicle seat is released. The rotary gear 5 doesn't rotate here.

As described, the present invention realizes both the unlocking of the vehicle seat according to the drives of motor M and the unlocking of the vehicle seat according to the manual unlocking operation rod, using a simple mechanism. Therefore, the present invention can simplify said mechanism, and decrease numbers of parts and assembling steps of the unlocking actuator 1. For this reason, the manufacturing cost of the unlocking actuator 1 can be reduced. In addition, excessive running of the motor M can be prevented, since both the automatic operation according to the motor M and the manual operation according to the manual or other unlocking operation rod are used. For this reason, burning of the motor can be prevented. Furthermore, power consumption of the unlocking actuator 1 can be decreased, comparing with the case where only motor M is used to unlock the vehicle seat. For this reason, power consumption of vehicle can be reduced.

Embodiment 2

Figure 7:
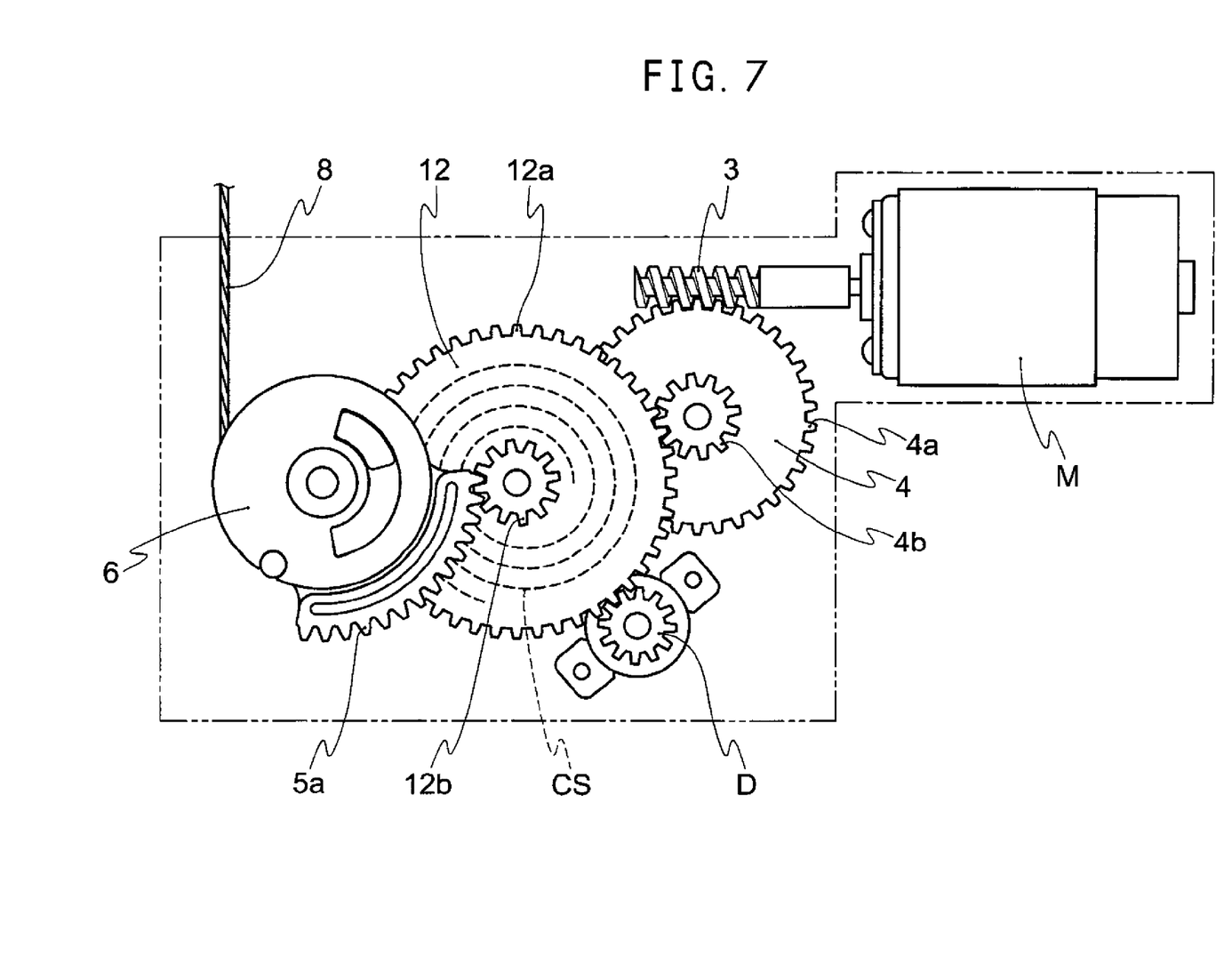
FIG. 7 shows another embodiment of the unlocking actuator of the present invention.

FIG. 7 shows another embodiment of the unlocking actuator 1 according to the present invention. What is different to embodiment 1 is that there is no second inner cable 9, and that a dual gear 12 exists between the worm wheel 4 and the rotary gear 5, and that a gear damper D engaging a the great gear section 12a of the dual gear 12 is provided.

By providing the gear damper 12, impact added to the small gear section of the dual gear 12 and the sectorial gear 5a of the rotary gear 5 is softened, and damage of the small gear section 12b and the sectorial gear section 5a is prevented.

That is, the dual gear 12 installed to the direction returning to the initial position (counterclockwise) by the coil spring CS, and in case there is no gear damper D, the dual gear 12 is returned to the initial position energetically by power of the coil spring CS. Then, the sectorial gear section 5a meshing the small gear section 12b of the dual gear 12 also rotates energetically, and abuts on the rubber damper 7 with vigor. As a result, the sectorial 5a meshing the small gear section 12b of the dual gear 12 is damaged. Similarly, the small gear section 12b of the dual gear 12 is also damaged because of the impact. Therefore, by reducing rotary speed of the dual gear 12 by the gear damper D, it can prevent the sectorial gear section 5a and the small gear section 12b from being damaged.

Figure 8:
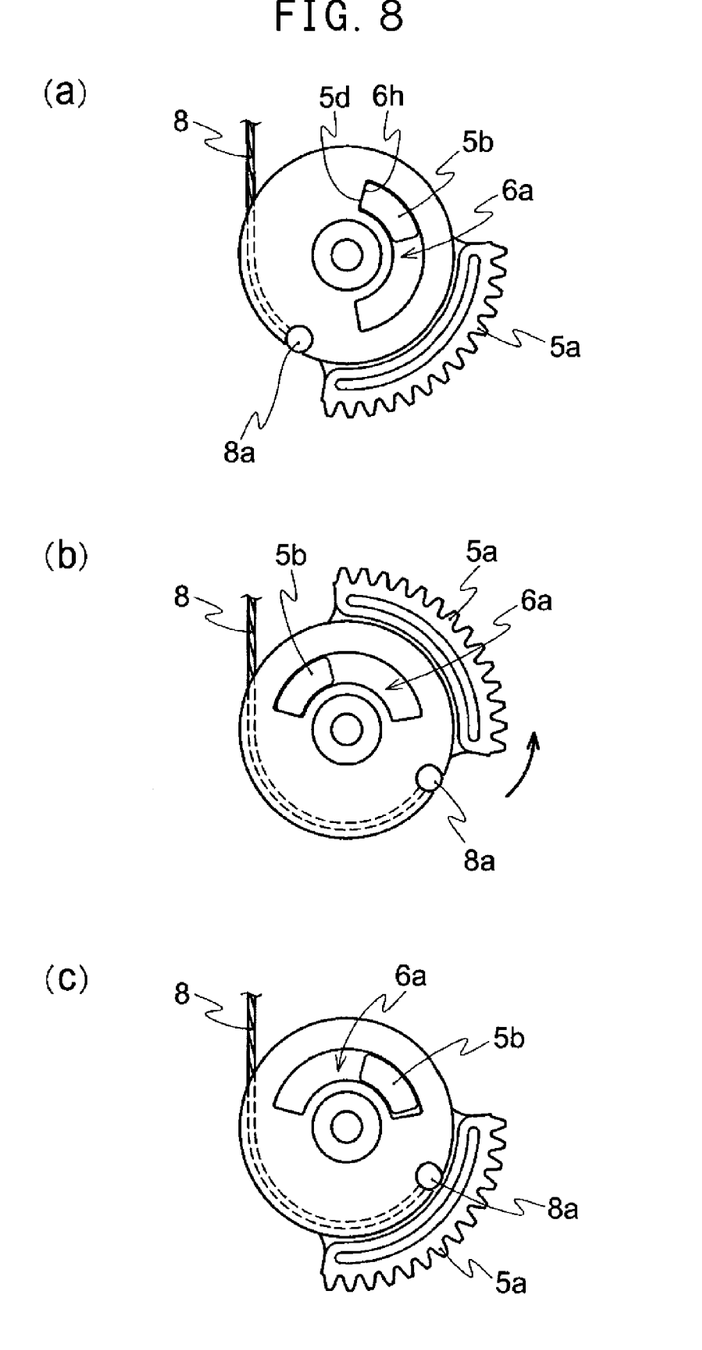
FIG. 8 is an explanatory diagram showing the unlocking operation in another embodiment of the unlocking actuator of the present invention.

FIG. 8 is an explanatory diagram showing an unlocking operation in the embodiment 2. In embodiment 2, the second inner cable which is pulled by the manual unlocking operation rod is unnecessary. Accordingly, there is no need of a second groove for winding 6c, a first abutting surface 6f, a second abutting surface 6g, and a small outside diameter section 6e of the pulley 6.

In FIG. 8(a), the rotary gear 5 stops at the initial position of FIG. 7, at the state in which it is installed counterclockwise by a coil spring (unillustrated) through the dual gear 12, and the vehicle seat is fixed in the initial position by a rocking mechanism (unillustrated). In this locked state, the opposite surface 5d (FIG. 3(a)) formed in the projecting portion 5b of the rotary gear 5 abuts on the abutting surface 6h (FIG. 4(a)) formed in the insertion hole 6a of the pulley 6.

FIG. 8(b) is an explanatory diagram showing an unlocking operation using an electric motor M. In order to unlock vehicle seat from the locked state described in FIG. 8(a), the supply of the electric power to the motor M is started. Synchronized with the supply of the electric power, a rotary torque generated by electric motor M is transmitted to a sectorial gear section 5a through a worm gear 3, a worm wheel 4, and the dual gear 12, and the rotary gear 5 and rotates counterclockwise. Because of the counterclockwise rotation of the rotary gear 5, the projecting portion 5b of the rotary gear 5 also rotates counterclockwise. Accordingly, the abutting surface 6h of the pulley 6 is pressured to the opposite surface 5d of the projecting portion 5b counterclockwise, and the pulley 6 also rotates counterclockwise. Because one end side 8a of the first inner cable 8 is fixed to the pulley, accompanying with the rotation of the pulley 6, the first inner cable 8 is rotated by the first groove for winding 6b of the pulley 6, and thereby the unlocking mechanism is operated. By this operation, the unlocking of the vehicle seat is achieved.

When the operation of unlocking mechanism is finished, the worm gear 3, the worm wheel 4, the dual gear 12, and the rotary gear 5 are returned to the former initial position (FIG. 8(c)) due to the restoring force of a coil spring provided in the dual gear 12. In addition, when the unlocking mechanism is operated and the first inner cable is pulled, the pulley 6 rotates counterclockwise and the pulley 6 is returned to the initial position.

According to the embodiment, unlocking the vehicle seat is achieved by the drives of the motor M, using a simple mechanism. Therefore, the present invention can simplify said mechanism, and decrease numbers of parts and assembling steps of the unlocking actuator 1. For this reason, the manufacturing cost of the unlocking actuator 1 can be reduced.

From now we have explained the present invention in detail, but the above embodiment and the variable of the embodiment are only one example of the invention and the present invention isn't limited to these embodiments. It is apparent that changes can be made, without departing from the scope of the present invention.

EXPLANATION OF SYMBOLS

1—unlocking actuator
2, 2a, 2b—housing
3—worm gear
4—worm wheel
4a—great gear section
4b—small gear section
5—rotary gear
5a—sectorial gear section
5b—projecting portion
5c, 6i—penetration
5d—opposite surface
6—pulley
6a—insertion hole
6b—first groove for winding
6c—second groove for winding
6d—islands
6e—small outside diameter
6f, 6g, 6h—abutting surface
7—rubber damper
8—first inner cable
9—second inner cable
8a, 9a—one end side
10, 11—inner cable guide
12—dual gear
12a—great gear section
12b—small gear section
AX1, AX2—shaft
B1—shaft receptor section
CS—coil spring
D—gear damper
L1—unlocking lever
L2—unlocking operation rod
M—motor
S—shaft
T—connector section
W—wire

INDUSTRIAL APPLICABILITY

An unlocking actuator of the present invention realizes both the unlocking of the vehicle seat according to the drives of an electric motor and the unlocking of the vehicle seat according to a manual unlocking operation rod, using a simple mechanism. Therefore, the present invention can simplify said mechanism, and decrease numbers of parts and assembling steps of the unlocking actuator. For this reason, the manufacturing cost of the unlocking actuator can be reduced. In addition, excessive running of the electric motor can be prevented, since both the automatic operation according to the electric motor and the manual operation according to the manual or other unlocking operation rod are used. For this reason, burning of the motor can be prevented. Furthermore, power consumption of the unlocking actuator can be decreased, comparing with the case where only an electric motor is used to unlock the vehicle seat. For this reason, power consumption of vehicle can be reduced.

(2) In such an actuator, when a second groove for winding is formed smaller than other sections, has a first and second abutting surfaces on which each side end of the second inner cable abuts, and provides the small outside diameter attaching to the first and second abutting surfaces, both an unlocking vehicle seat by automatic operation and an unlocking vehicle seat by manual and other operations are realized. Accordingly, the unlocking mechanism can be simplified.

(3) In addition, when the first groove for winding has islands which attach to one end side of the first inner cable, and it can attach and fix the first inner cable to the first groove for winding certainly, numbers of parts and assembling steps of the unlocking actuator can be decreased. For this reason, the manufacturing cost of the unlocking actuator can be reduced.

What is claimed is:

1. An unlocking actuator comprising:
a rotary gear configured to rotate by which rotary torque generated by an electric motor in order to unlock a vehicle seat is transmitted through rotary torque transmission means;
a pulley in which a substantially sectorial insertion hole is formed along a rotational direction and an abutting surface is formed on one end side of the insertion hole;
a first inner cable having one end fixed to a first groove for winding formed in an outer circumferential part of said pulley and wound in said first groove for winding, and another end connected with an unlocking mechanism; and
a second inner cable having one end fitted idly in a second groove for winding formed in said outer circumferential part of said pulley and wound in said second groove for winding, and another end connected with an unlocking operation rod;
wherein said rotary gear is provided in a position which corresponds with said insertion hole, has an opposite surface against said abutting surface of said pulley, and provides a projecting portion rotating inside said insertion hole; and
wherein said pulley is configured to unlock a lock when said rotary torque is transmitted to said rotary gear and said opposite surface abuts said abutting surface by rotating with said rotary gear and wind said first inner cable around said pulley to activate said unlocking mechanism, and is configured to unlock said lock by rotating when said second inner cable is pulled to a side of said unlocking operation rod by operation of said unlocking operation rod and wind said first inner cable around said pulley to activate said unlock mechanism.

2. An unlocking actuator comprising:
a rotary gear configured to rotate by which rotary torque generated by an electric motor in order to unlock a vehicle seat is transmitted through rotary torque transmission means, wherein said rotary gear rotates by a shaft;
a pulley in which a substantially sectorial insertion hole is formed along a rotational direction and an abutting surface is formed on one end side in a rotational direction of the insertion hole, wherein said pulley is arranged coaxially with said rotary gear and rotatable relative to said rotary gear; and
a first inner cable having one end fixed to a first groove for winding formed in an outer circumferential part of said pulley and wound in said first groove for winding, and another end connected with an unlocking mechanism;
wherein said rotary gear comprises a projecting portion being rotatable around said shaft inside said insertion hole, wherein said projecting portion is provided in a position which corresponds with said insertion hole, and has an opposite surface against said abutting surface of said pulley; and
wherein said pulley is configured to unlock a lock when said rotary torque is transmitted to said rotary gear and said opposite surface abuts said abutting surface by rotating with said rotary gear and wind said first inner cable around said pulley to activate said unlocking mechanism.

3. The unlocking actuator according to claim 1, wherein said second groove for winding comprises an outside diameter that is formed smaller than other sections of said pulley, and has first and second abutting surfaces on which each side end of said second inner cable abuts, and provides the outside diameter attaching to said first and second abutting surfaces.

4. The unlocking actuator according to claim 1, wherein said first groove for winding is configured to provide islands attaching one end side of said first inner cable.

5. The unlocking actuator according to claim 2, wherein said first groove for winding is configured to provide islands attaching one end side of said first inner cable.

\* \* \* \* \*